(12) United States Patent
Crow et al.

(10) Patent No.: US 6,940,509 B1
(45) Date of Patent: Sep. 6, 2005

(54) SYSTEMS AND METHODS FOR IMPROVING CONCEPT LANDSCAPE VISUALIZATIONS AS A DATA ANALYSIS TOOL

(75) Inventors: Vernon L. Crow, Richland, WA (US); Randall E. Scarberry, Richland, WA (US); Augustin J. Calapristi, Richland, WA (US); Nancy E. Miller, San Diego, CA (US); Jeffrey D. Saffer, Richland, WA (US)

(73) Assignee: Battelle Memorial Institute, Columbus, OH (US)

( * ) Notice: Subject to any disclaimer, the term of this patent is extended or adjusted under 35 U.S.C. 154(b) by 275 days.

(21) Appl. No.: 09/675,515

(22) Filed: Sep. 29, 2000

(51) Int. Cl.[7] .................................... G06T 11/00
(52) U.S. Cl. ....................................... 345/440
(58) Field of Search ............... 345/440, 441, 345/467–472.3, 618

(56) References Cited

U.S. PATENT DOCUMENTS

| | | | |
|---|---|---|---|
| 5,325,298 A | 6/1994 | Gallant .................. 364/419.19 |
| 5,361,326 A | 11/1994 | Aparicio, IV et al. ........ 395/21 |
| 5,506,937 A * | 4/1996 | Ford et al. ..................... 706/11 |
| 5,528,735 A | 6/1996 | Strasnick et al. ........... 395/127 |
| 5,555,354 A | 9/1996 | Strasnick et al. ........... 395/127 |
| 5,625,767 A | 4/1997 | Bartell et al. ............... 395/140 |
| 5,659,766 A | 8/1997 | Saund et al. ................ 395/759 |
| 5,671,381 A | 9/1997 | Strasnick et al. ........... 395/355 |
| 5,675,788 A | 10/1997 | Husick et al. .............. 395/615 |
| 5,687,364 A | 11/1997 | Saund et al. ................ 395/605 |
| 5,692,107 A | 11/1997 | Simoudis et al. ............. 395/50 |
| 5,696,963 A | 12/1997 | Ahn ........................... 395/605 |
| 5,721,903 A | 2/1998 | Anand et al. ............... 395/605 |
| 5,721,912 A | 2/1998 | Stepczyk et al. ........... 395/613 |
| 5,732,260 A | 3/1998 | Nomiyama ................. 395/605 |
| 5,737,591 A | 4/1998 | Kaplan et al. .............. 395/601 |
| 5,767,854 A | 6/1998 | Anwar ....................... 345/355 |
| 5,784,544 A | 7/1998 | Stevens ...................... 395/112 |
| 5,787,274 A | 7/1998 | Agrawal et al. ............ 395/613 |
| 5,794,178 A | 8/1998 | Caid et al. ...................... 704/9 |
| 5,838,973 A | 11/1998 | Carpenter-Smith et al. . 395/701 |
| 5,842,206 A | 11/1998 | Sotomayor ..................... 707/5 |
| 5,857,179 A | 1/1999 | Vaithyanathan et al. ....... 707/2 |
| 5,857,185 A | 1/1999 | Yamaura ........................ 707/5 |
| 5,861,891 A | 1/1999 | Becker ....................... 345/433 |
| 5,864,863 A | 1/1999 | Burrows ..................... 707/103 |
| 5,873,076 A | 2/1999 | Barr et al. ...................... 707/3 |
| 5,907,838 A | 5/1999 | Miyasaka et al. .............. 707/4 |
| 5,913,214 A | 6/1999 | Madnick et al. ............. 707/10 |
| 5,918,010 A | 6/1999 | Appleman et al. ..... 395/200.33 |
| 5,926,806 A | 7/1999 | Marshall et al. ............... 707/3 |

(Continued)

*Primary Examiner*—Jeffery A. Breir
(74) *Attorney, Agent, or Firm*—Finnegan, Henderson, Farabow, Garrett & Dunner, LLP; Konstantin Linnik, Esq.

(57) ABSTRACT

Systems and methods provide several enhancements for the viewing, analysis, and generation of landscape views in a data analysis system, including: allowing a user to select from multiple methods to generate a landscape view, providing labels for peaks of a landscape, enabling the user to replace labels displayed on the landscape view, enabling a landscape view to be recalculated based on the replacement labels, and allowing a user to switch or morph between two landscape views generated by different methods. Such methods or systems generate graphical landscape map visualizations from a set of data records.

22 Claims, 11 Drawing Sheets

U.S. PATENT DOCUMENTS

| | | | |
|---|---|---|---|
| 5,926,820 A | 7/1999 | Agrawal et al. | 707/200 |
| 5,930,784 A * | 7/1999 | Hendrickson | 707/2 |
| 5,930,803 A | 7/1999 | Becker et al. | 707/104 |
| 5,945,982 A | 8/1999 | Higashio et al. | 345/203 |
| 5,953,716 A | 9/1999 | Madnick et al. | 707/4 |
| 5,963,965 A | 10/1999 | Vogel | 707/501 |
| 5,966,139 A | 10/1999 | Anupam et al. | 345/440 |
| 5,982,370 A | 11/1999 | Kamper | 345/356 |
| 5,986,652 A | 11/1999 | Medl et al. | 345/339 |
| 5,987,470 A * | 11/1999 | Meyers et al. | 707/102 |
| 5,991,714 A | 11/1999 | Shaner | 704/9 |
| 5,999,192 A | 12/1999 | Selfridge et al. | 345/440 |
| 5,999,937 A | 12/1999 | Ellard | 707/101 |
| 6,012,053 A | 1/2000 | Pant et al. | 707/3 |
| 6,014,661 A | 1/2000 | Ahlberg et al. | 707/3 |
| 6,023,694 A | 2/2000 | Kouchi et al. | 707/2 |
| 6,026,409 A | 2/2000 | Blumenthal | 707/104 |
| 6,029,176 A | 2/2000 | Cannon | 707/104 |
| 6,032,157 A | 2/2000 | Tamano et al. | 707/104 |
| 6,034,697 A * | 3/2000 | Becker et al. | 345/606 |
| 6,038,538 A | 3/2000 | Agrawal et al. | 705/7 |
| 6,038,561 A * | 3/2000 | Snyder et al. | 707/6 |
| 6,044,366 A | 3/2000 | Graffe et al. | 707/2 |
| 6,049,806 A | 4/2000 | Crecine | 707/200 |
| 6,058,391 A | 5/2000 | Gardner | 707/4 |
| 6,067,542 A | 5/2000 | Cariño, Jr. | 707/4 |
| 6,073,115 A | 6/2000 | Marshall | 705/35 |
| 6,073,138 A | 6/2000 | de l'Etraz et al. | 707/104 |
| 6,078,314 A | 6/2000 | Ahn | 345/169 |
| 6,078,914 A | 6/2000 | Redfern | 707/3 |
| 6,081,788 A | 6/2000 | Appleman et al. | 705/14 |
| 6,081,802 A | 6/2000 | Atherton et al. | 707/3 |
| 6,085,190 A | 7/2000 | Sakata | 707/6 |
| 6,088,032 A | 7/2000 | Mackinlay | 345/355 |
| 6,092,061 A | 7/2000 | Choy | 707/1 |
| 6,094,648 A | 7/2000 | Aalbersberg | 707/3 |
| 6,094,649 A | 7/2000 | Bowen et al. | 707/3 |
| 6,098,065 A | 8/2000 | Skillen et al. | 707/3 |
| 6,100,901 A | 8/2000 | Mohda et al. | 345/440 |
| 6,101,493 A | 8/2000 | Marshall et al. | 707/3 |
| 6,108,004 A | 8/2000 | Medl | 345/346 |
| 6,108,651 A | 8/2000 | Guha | 707/4 |
| 6,108,666 A | 8/2000 | Floratos et al. | 707/104 |
| 6,111,578 A * | 8/2000 | Tesler | 345/850 |
| 6,112,194 A | 8/2000 | Bigus | 706/11 |
| 6,112,209 A | 8/2000 | Gusack | 707/101 |
| 6,121,969 A | 9/2000 | Jain et al. | 345/355 |
| 6,122,636 A | 9/2000 | Malloy et al. | 707/102 |
| 6,128,624 A | 10/2000 | Papierniak et al. | 707/104 |

* cited by examiner

SYSTEMS AND METHODS FOR IMPROVING CONCEPT LANDSCAPE VISUALIZATIONS AS A DATA ANALYSIS TOOL

I. FIELD OF THE INVENTION

This invention relates generally to the methods for displaying and analyzing textual information graphically.

II. BACKGROUND OF THE INVENTION

Analysis of large volumes of textual information has been greatly enhanced through the application of data visualization methods. Some types of visualizations are geared toward identifying similarity among documents within a data set and some types are focused on revealing the major concepts contained in the documents.

Chalmers, *Using a landscape metaphor to represent a corpus of documents*, In Spatial Information Theory, Frank and Campari, eds., Springer-Verlag, pp. 377–390, 1993, introduced a landscape metaphor for representing the content of a corpus of text documents. This was then extended and refined by Wise et al. (Wise et al., *Visualizing the Non-Visual: Spatial analysis and interaction with information from text documents*, Proc. IEEE Visualization 95, N. Gershon and S Eick, eds., IEEE Computer Society Press, Los Alamitos, Calif., pp. 51–58, 1995; Wise, *The Ecological Approach to Text Visualization*, J American Society for Information Science 50:1224–1233, 1999).

In the Wise et al. approach, an aggregate theme algorithm is applied to construct a three-dimensional representation over a framework defined by a two-dimensional representation of the information space (a Galaxies view). The surface plot is built in a grid by adding together the contributions of each thematic term to the documents in the grid region using a common term frequency metric (Salton, Developments in automatic text retrieval. Science 253: 974–980, 1991). The map is then smoothed to provide the terrain representation. In this approach, the peak height displayed on the terrain represents a combination of document density and thematic content.

Another landscape type view has been used for text documents by Irwin et al. (*Navigating Nuclear Science: Enhancing Analysis through Visualization*, Sandia Report SAND97-2218, 1997). In this approach, the landscape view is simply redundant encoding of the document density overlaid on a two-dimensional proximity map. All thematic content or concepts are derived from the mathematics underlying the calculation of similarity measures and their application to deriving the proximity map.

The landscape view of the themes or content of a document set is distinct from other types of visualizations that provide visual overviews of the relation of one document to another. These methods include self-organizing maps (Kohonen, *Self-organization and associative memory*, 3rd edition, Berlin, Springer-Verlag), hierarchical taxonomy-based visualizations (U.S. Pat. No. 5,625,767 to Bartell and Clarke), geometric space representations (U.S. Pat. No. 5,930,784 to Hendrickson; U.S. Pat. No. 5,987,470 to Meyers et al.; U.S. Pat. No. 5,794,178 to Caid and Carleton). However, these alternative types of visualizations can serve as the two-dimensional framework on which the landscape visualization can be built.

The terminology information landscape has also been applied to methods for three-dimensional displays of graphical objects (U.S. Pat. No. 5,528,735 to Strasnick and Tesler; U.S. Pat. No. 5,555,354 to Strasnick and Tesler; U.S. Pat. No. 5,671,381 to Strasnick and Tesler). However, this type of landscape is distinct from the direct use of a contour map landscape representation.

Concept-based maps of information have also been described in U.S. Pat. No. 5,506,937 to Ford et al. These maps show the hierarchy in information concepts using a tree type visualization. Tree-type visualizations, such as cone tree view, have additionally been described in U.S. Pat. No. 6,088,032 to Mackinlay. These visualization approaches do not use a landscape metaphor.

While prior landscape visualization methods and systems have provided useful representations of data sets to enable the relationships between documents or data sets to be determined, the use of methods or systems can be improved by the addition of tools that enable the data to be presented based on user customizations and that enable data underlying the view to be more readily viewed or explored.

III. SUMMARY OF THE INVENTION

Generally described, the present invention provides several enhancements for the viewing, analysis, and generation of landscape views, including: allowing a user to select from multiple methods to generate a landscape view, providing labels for peaks of a landscape, enabling the user to replace labels displayed on the landscape view, enabling a landscape view to be recalculated based on the replacement labels, and allowing a user to switch or morph between two landscape views generated by different methods.

More particularly, methods or systems consistent with the present invention generate graphical landscape map visualizations from a set of data records. Vector representations are created based on the data records and a user may select from a first landscape map generation method or a second landscape map generation method to generate first and second landscape map representations corresponding to the vector representations.

The first landscape map generation method may calculate peak height based on a used supplied topicality value and the second landscape map generation method may calculate the map based on the aggregate values of topicality parameters. A user may switch or morph between the first and second landscape map to determine the influence of the first and second landscape map generation methods on the data records. A two-dimensional galaxy view of the data records may be superimposed on either the first or second landscape map representation.

In another aspect consistent with the present invention, a user may choose to generate a second surface map representation based on a replacement term that is substituted for two or more selected terms that were used to generate the original surface map. The replacement term is considered to occur at all data record locations where the selected terms occurred and the second surface map is generated based on the occurrence of the replacement term at the locations. By using this aspect of the present invention, a user can identify terms that are different in form but are equivalent, such as synonyms, and cause those terms to be represented by a single replacement term. This aspect of the present invention enables terms that where not considered equivalent during generation of the original surface map to be considered as equivalent terms for the generation of a second surface map.

Other aspects or embodiments consistent with the present invention are discussed herein.

IV. BRIEF DESCRIPTION OF THE DRAWINGS

V. DETAILED DESCRIPTION

Reference will now be made in detail to an embodiment of the present invention al illustrated in the accompanying drawings.

A. Overview

Methods and apparatus are described that create, and enable interaction with, a concept map visualization of textual information. Systems and methods consistent with the present invention prepare text for analysis and visualization in a data mining system. Text processing modules accept textual information and produce context vectors for subsequent clustering and projection into visualization systems.

The general process for producing data structured for data mining is as follows: First, the information represented by data records is received in electronic form. Second, the data records are analyzed to produce high-dimensional vector representations of the data record based on attributes of the records. Third, the high-dimensional vectors are grouped to identify relationships (e.g. clustering). Fourth, the high-dimensional vectors are converted to a two-dimensional representation, a projection, for use by a display system for viewing the collected data.

Methods and systems consistent with the present invention provide several enhancements for the viewing, analysis, and generation of landscape views, including: allowing a user to select from multiple methods to generate a landscape view, providing labels for peaks of a landscape, enabling the user to replace labels displayed on the landscape view, enabling a landscape view to be recalculated based on the replacement labels, and allowing a user to switch or morph between two landscape views generated by different methods. Such systems and methods may also receive a substitute term to be substituted for two or more selected original terms of the data records and may generate a surface map representation based on the substitute term occurring at the data record locations of selected original terms. The substitute term may be considered a synonym for the original terms substitute term replaced. Numerous other computational options and interactive features are also described.

These methods can be applied to textual information, whether the data records are solely textual or have textual components.

B. Architecture

Figure 1:
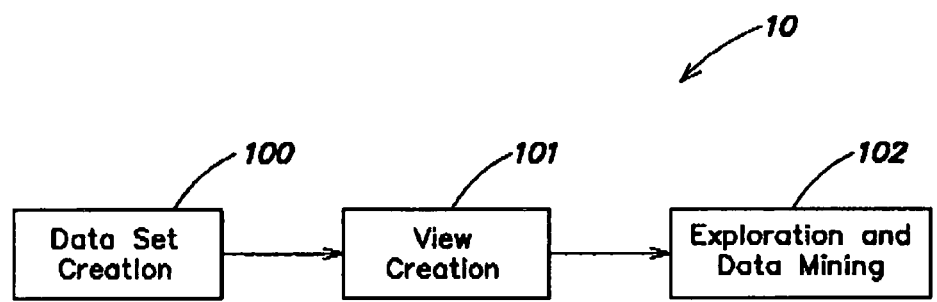
FIG. 1 is a block diagram of a data analysis and mining system consistent with the present invention.

Referring to FIG. 1, a block diagram is shown of a data visualization and data mining system 10. The data visualization and data mining system includes a data set importation and creation system 100, a view creation system 101, and a data presentation and mining system 102. The data set importation and creation system 100 imports data sets of various types and enables the creation of a data set customized to a user's desires and useful for generating visualizations. The view creation system 101 enables the set-up of data visualizations from imported data and the creation of underlying structures used by the data presentation and mining system 102. The data presentation and mining system 102 presents visualizations of user-defined views of the data, and enables interactions through one or more tool sets. Typically, the data visualization and data mining system 10 is embodied in a computer system and accesses electronic information from within its data stores or from other systems to which it is connected. The systems 100, 101, and 102 typically include computer program modules accessible from the memory of a computer system.

Figure 2:
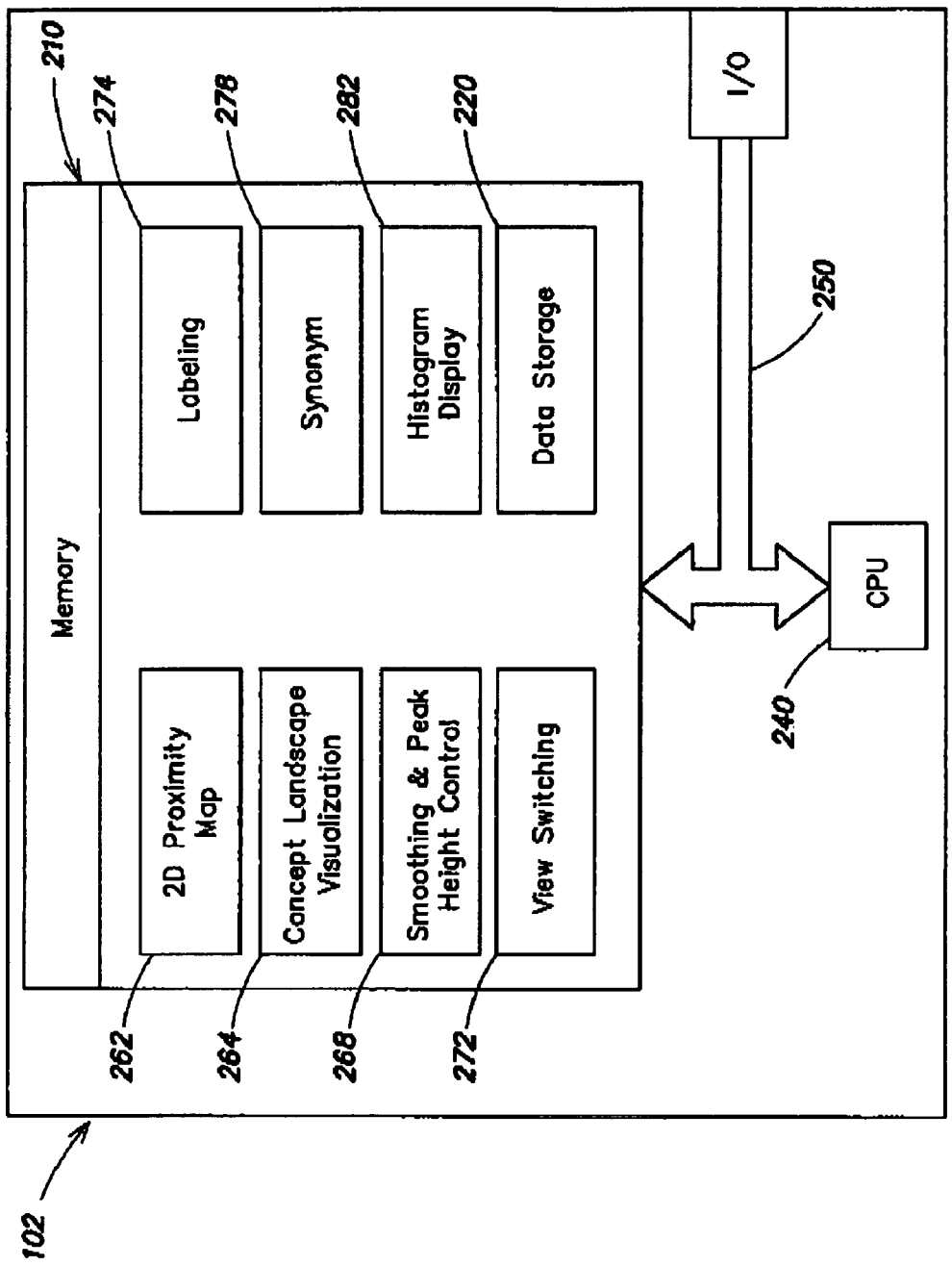
FIG. 2 is a block diagram of a computer system consistent with the present invention.

A system consistent with the present invention provides an improved data exploration and mining system for a data analysis system, such as the system 102. Referring to FIG. 2, a more detailed view of the data exploration and mining system 102, consistent with the present invention, is shown. The data exploration and mining system 102 is embodied in a computer system. Computer programs used to implement methods consistent with the present invention are generally located in a memory unit 210, and the processes of the present invention are carried out through the use of a central processing unit (CPU) 240 in conjunction with application programs or modules. Those skilled in the art will appreciate that memory unit 210 is representative of read-only, random access memory, and other memory elements used in a computer system. For simplicity, many components of a computer system have not been illustrated, such as address buffers and other standard control circuits. These elements are well known in the art.

Memory unit 210 contains databases, tables, and files 220 and program modules that are used in carrying out the processes associated with the present invention. CPU 240, in combination with computer software and an operating system, controls the operations of the computer system. Memory unit 210, CPU 240, and other components of the computer system communicate via a bus 250. Data or signals resulting from the processes of the present invention are output from the computer system via an input/output (I/O) interface, which may be coupled to a display monitor for viewing and user interaction. User input from a keyboard or selection device may be received through the I/O port. Object oriented programming is suitable for programming the functions and modules consistent with the present invention, although one skilled in the art will recognize that other suitable methods are available.

Memory unit 210 contains various program modules: a two-dimensional proximity map module 262, a concept landscape visualization module 264, a smoothing and peak height control module 268, a view switching module 272, a labeling module 274, a synonym module 278, and histogram display module 282. The two-dimensional map module 262 creates a list of features for generating a mathematical signature for each data record and then creates a representation of those records in the form of a two-dimensional map, such as a galaxy map. The creation of the mathematical signature includes processes for automatically identifying the features or data attributes to be used or for manual assignment of those features. For text information, those features or attributes may be words, phrases, or other components of the text. The concept landscape visualization map module 264 generates a representation of a surface map for the data records. The smoothing and peak height control module 268 enables a user to specify user defined values for controlling the peak height of surface views and for controlling smoothing filters that are applied to the peaks of the surface views. The view switching module 272 enables a user to switch between two created views, such as switching between two surface map views. The label module 274 enables a user to customize label peaks of surface views. The synonym module 278 enables a user to specify other words, such as synonyms, to be used for a group of words that represent a similar theme or feature. The histogram display module 282 displays a bar chart list of terms or attributes of a record associated with a peak of a surface view.

C. Interfaces and Processes

Many of the processes consistent with the present invention are implemented in response to or in conjunction with user input provided through user interactive display screens and are described in connection with corresponding display screens. The display screens discussed operate in conjunction with corresponding program modules to carry out processes consistent with the present invention and as discussed in connection with the Figures.

Figure 3:
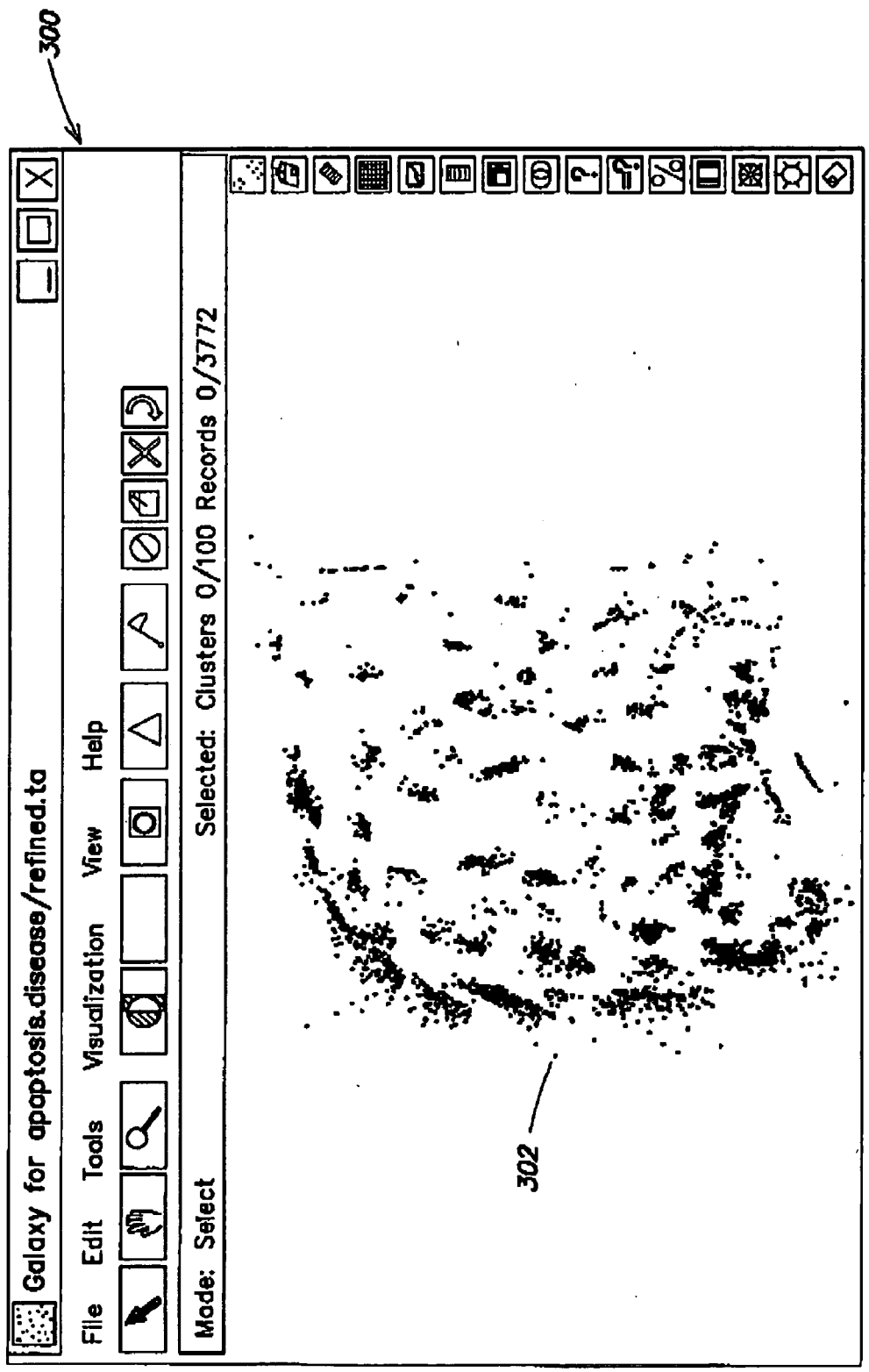
FIG. 3 shows an example of a two-dimensional galaxy map created from a text data set.

Referring to FIG. 3, a galaxy view screen 300 displaying a galaxy view 302 of the underlying data records is shown. The galaxy view 302 is a two-dimensional proximity map representation of the relationship of data records based on vector representations/mathematical signatures of the records. The galaxy view 302 results from the creation of mathematical signatures (vector representations) for each document (data record) within the data set using any of a number of methods known to those skilled in the art, such as statistical word-based feature extraction, natural language processing, or the use of other descriptive features including citations, author lists, and any other attributes. The methods generally include processes for assigning strength or relevance for each feature or attribute. From the resulting mathematical signatures, a two-dimensional projection or galaxy view 302 can be created using any of a number of known methods such as principal component analysis followed by multi-dimensional scaling. The resulting two-dimensional map represents the information space covered by the data set and may show, for example, how each record is related to every other record within that information space.

Figure 4:
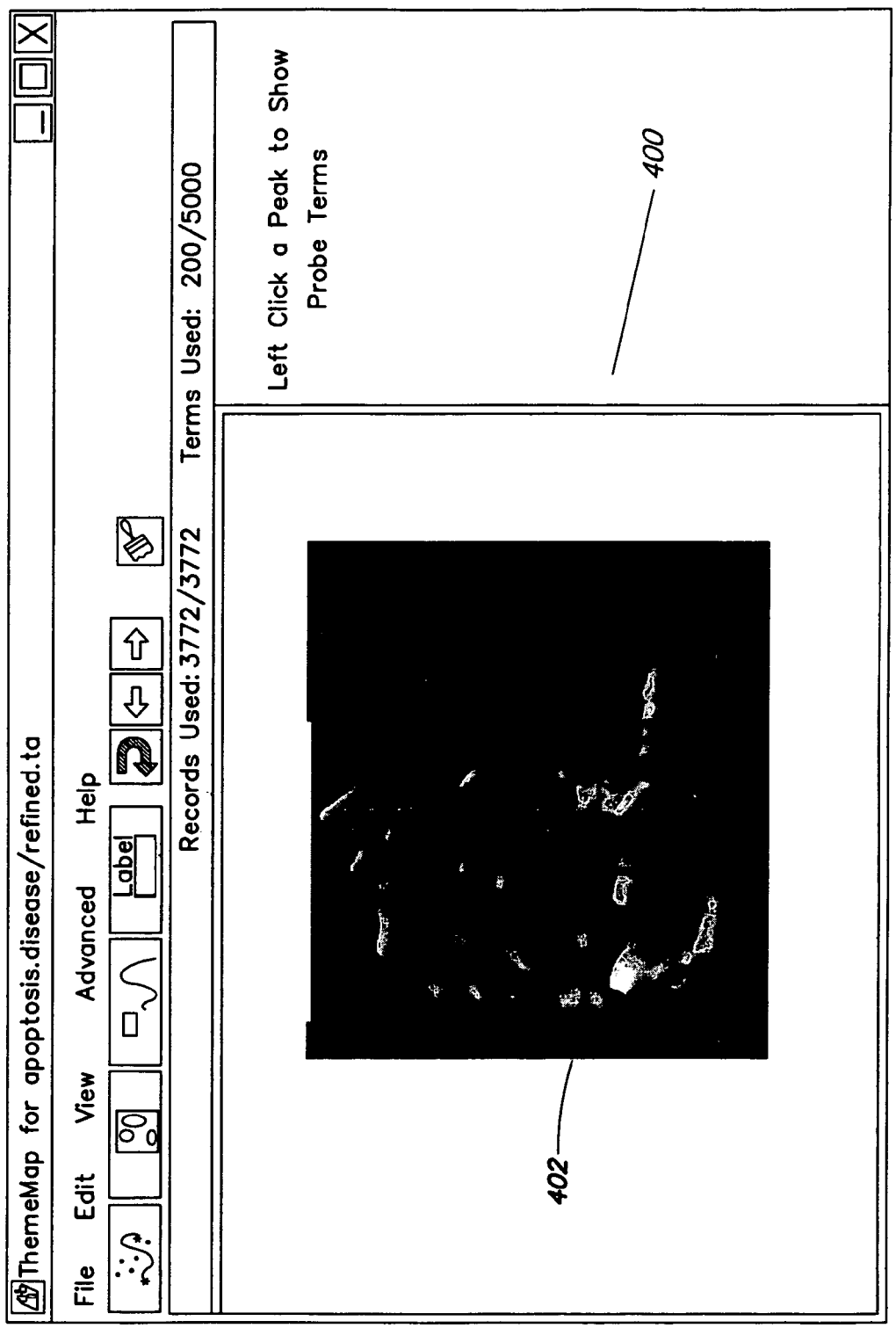
FIG. 4 is an example of a concept landscape visualization.

Referring to FIG. 4, a concept landscape visualization screen 400 illustrates a concept landscape visualization 402 of the underlying data set. The concept landscape visualization is derived from a two-dimensional view of the data set as discussed in connection with FIG. 3. The detail of the concept landscape space is produced in locations relative to the detail of by the two-dimensional map.

In one embodiment, the process of creating a concept landscape is encapsulated in a Java class called ThemeMapModel. Each time a new concept landscape view is generated, ThemeMapModel saves all the parameters and data structures (discussed below) from a possibly existing view, to reproduce a previously created concept landscape if the user desires by selecting a "Previous View" display control. Theme terms and record properties, as discussed below, are collected.

Theme terms are words or phrases, chosen by the user via the user interface or by default, to use in calculating the concept landscape surface height at each point on its grid. By default for word-based statistical feature extraction, a predefined number of the terms or phrases with the highest topicality in a data set's vocabulary are used as theme terms. Topicality is a mathematical quantity that indicates the ability of a particular word to express the content of a document and differentiate it from other documents in a set; topicality is one of the possible strength or relevance measures for text. For methods that use other features for creating the high-dimensional vector representation of the individual records or documents, the most significant attribute features (for example, those with highest topicality) are used as theme terms.

Record properties are data structures that encapsulate the identifier (for example, a data table row's identification number) for each record and the coordinates for that record on the underlying proximity map. Those coordinates may use a grid that is coarser than that of the 2 dimensional map visualization. In a preferred embodiment, the concept map grid is 100 by 100 cells. Thus, several records can occupy a single grid cell.

Once theme terms and record properties are established, ThemeMapModel computes the grid of surface values that will be displayed as surface heights and colors in the concept landscape visualization. The process also computes the grid of sorted terms that provide information displayed by the probe tool when the user interactively probes a grid cell, and finds the peaks in the surface data and records their grid positions. It should be appreciated that although the discussed creation of the concept landscape view is based on all of the records in the underlying two-dimensional map, the landscape surface may also be calculated using any subset of records within the original data set.

In addition to general magnification or adjustment of specific regions of the landscape view, the user may interactively define a region of interest (for example, sweep out a three-dimensional volume of the landscape display), which will subsequently be shown at full scale, providing a detailed view of a subset of the overall surface. This recalculation may subdivide the chosen region into the full grid size, providing greater resolution of concept features within that space. An optional inset can be displayed, showing the zoomed region in relationship to the overall visualization. This inset feature helps the user keep the context of the zoomed landscape view in proper perspective.

Figure 5:
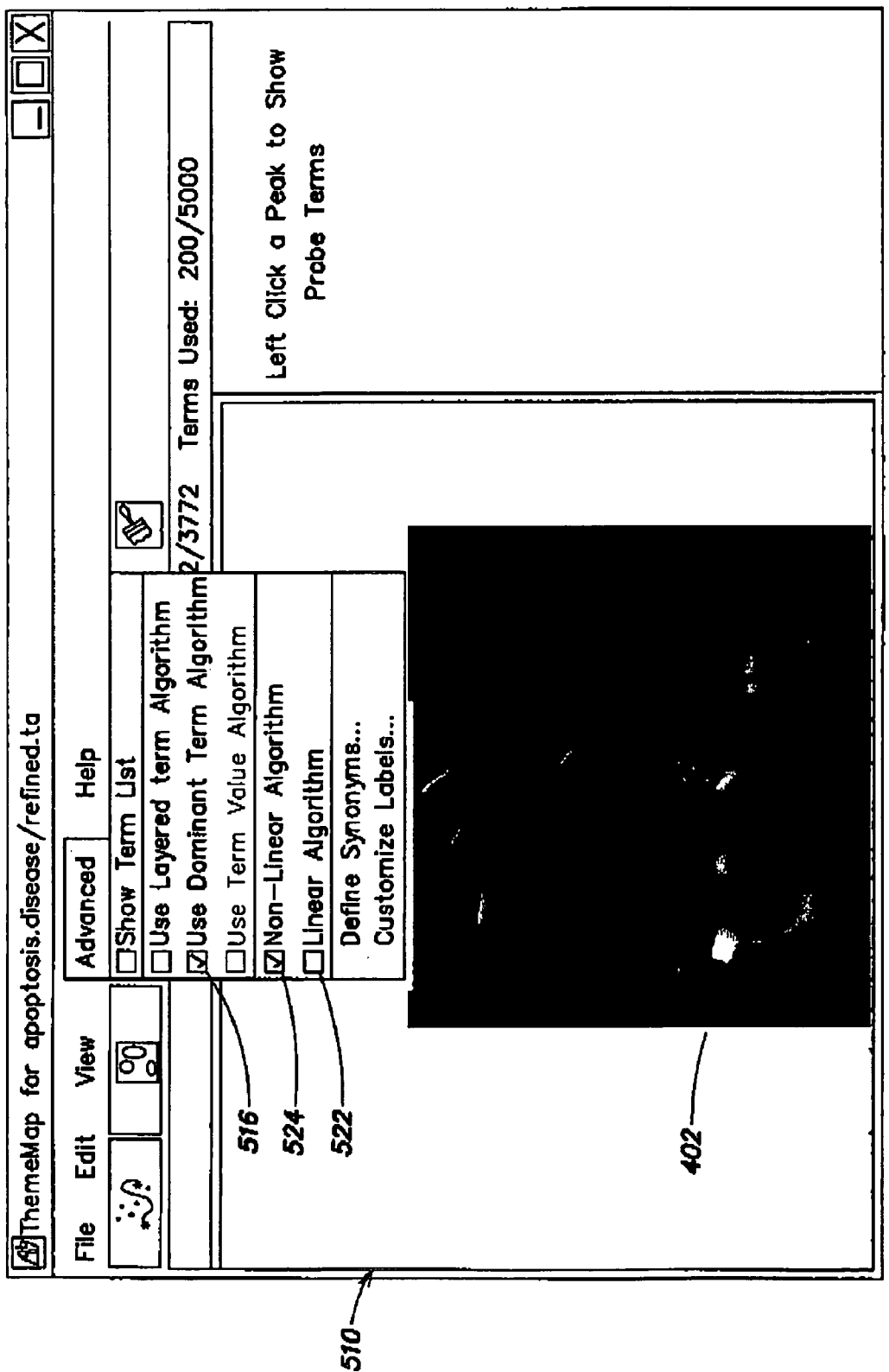
FIG. 5 shows interface for selecting optional settings available for choosing surface calculation algorithm and normalization algorithm.

Referring to FIG. 5, the landscape map 402 is shown with a choice of landscape generation options 510 for producing the landscape from the data records. Processes and systems consistent with the present invention enable a user to choose from one or more algorithms or methods for creating the landscape.

One of these algorithms may be a dominant theme algorithm indicated by option 516. The dominant theme algorithm attempts to find the one dominant theme at each grid cell, by tracking the number of records that contain each term at each cell and determining which theme term occurs in the maximum number of records. In case of ties, preference is given to the theme term with the greatest relevance for conveying concepts within the text. In the case of theme terms derived from word-based statistical approaches, the first term encountered in the topicality-ordered term list is selected as the dominant theme, thus giving preference to the term with the highest topicality value. This approach works with other types of attributes, such as phrases, or combination of attributes, where a significance or relevance measure is available.

Another useful algorithm is called an aggregate theme algorithm. Using this algorithm, all candidate terms present in all records at each grid cell contribute to the surface height at that cell, in proportion to their frequency of occurrence. As for the dominant theme algorithm, other types of attributes can be used instead of or in addition to single word features. One skilled in the art will recognize that other algorithms may also be used to compute the height value for each grid in the landscape view.

Figure 6:
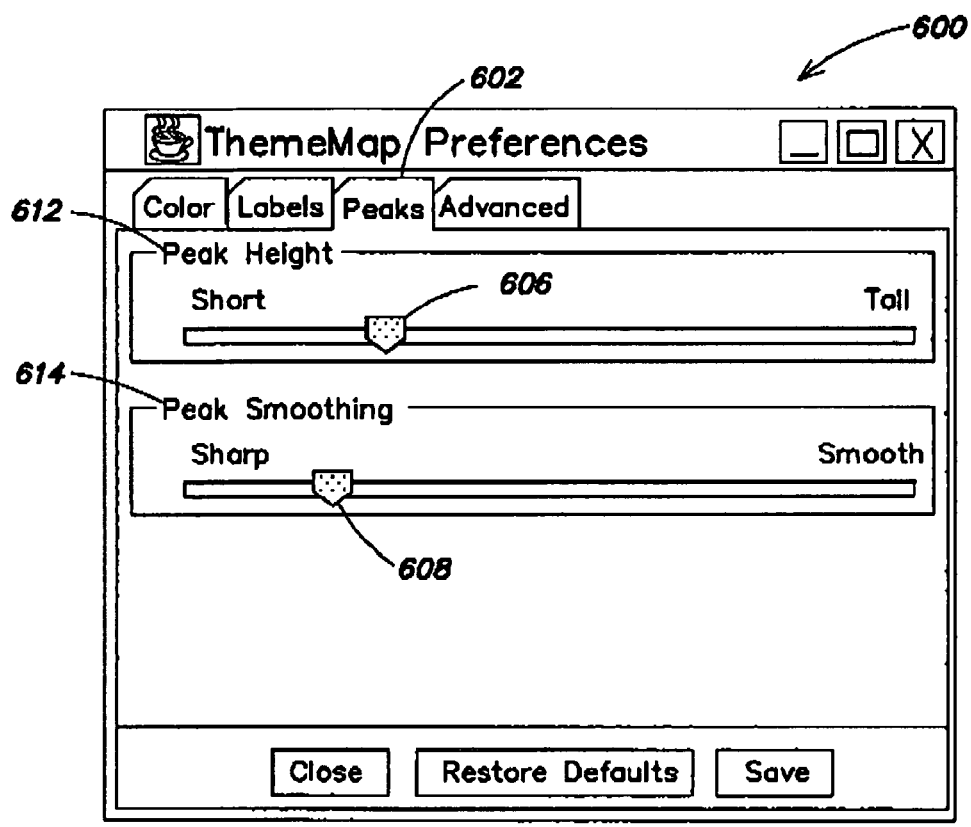
FIG. 6 shows an interface for adjusting peak height and peak smoothing.

Referring to FIG. 6, a user preference screen 600 is illustrated that enables a user to specify the user's preference for tailoring a landscape view to suit the user's desires. FIG. 6 shows the peaks tab 602 selected to enable customization for the display of peaks in the landscape view. Regardless of choice of algorithm, the grid cell values for the landscape view are smoothed by application of a square filter. The maximum peak height for the landscape can also be controlled. The user may, for example, specify by sliding scale selection mechanisms 606 and 608 the degree to which peak height 612 should be short or tall or the degree to which peak smoothing 614 should be sharp or smooth. The values for peak height may be saved and then retrieved for application when the landscape view is recalculated. The default size for the smoothing filter is 3 by 3 cells, but can optionally be set to any value, starting at unity, which effectively eliminates smoothing altogether. The landscape surface becomes smoother when a larger filter is chosen.

Also, the filtered surface grid can be normalized by one or more of several methods (FIG. 5). For example, linear or non-linear normalization may be used. Linear normalization 522 presents a truer representation of relative peak height, but may cause very high peaks to obscure small peaks. Non-linear normalization 524 de-emphasizes the difference between very large and very small peaks.

Figure 7:
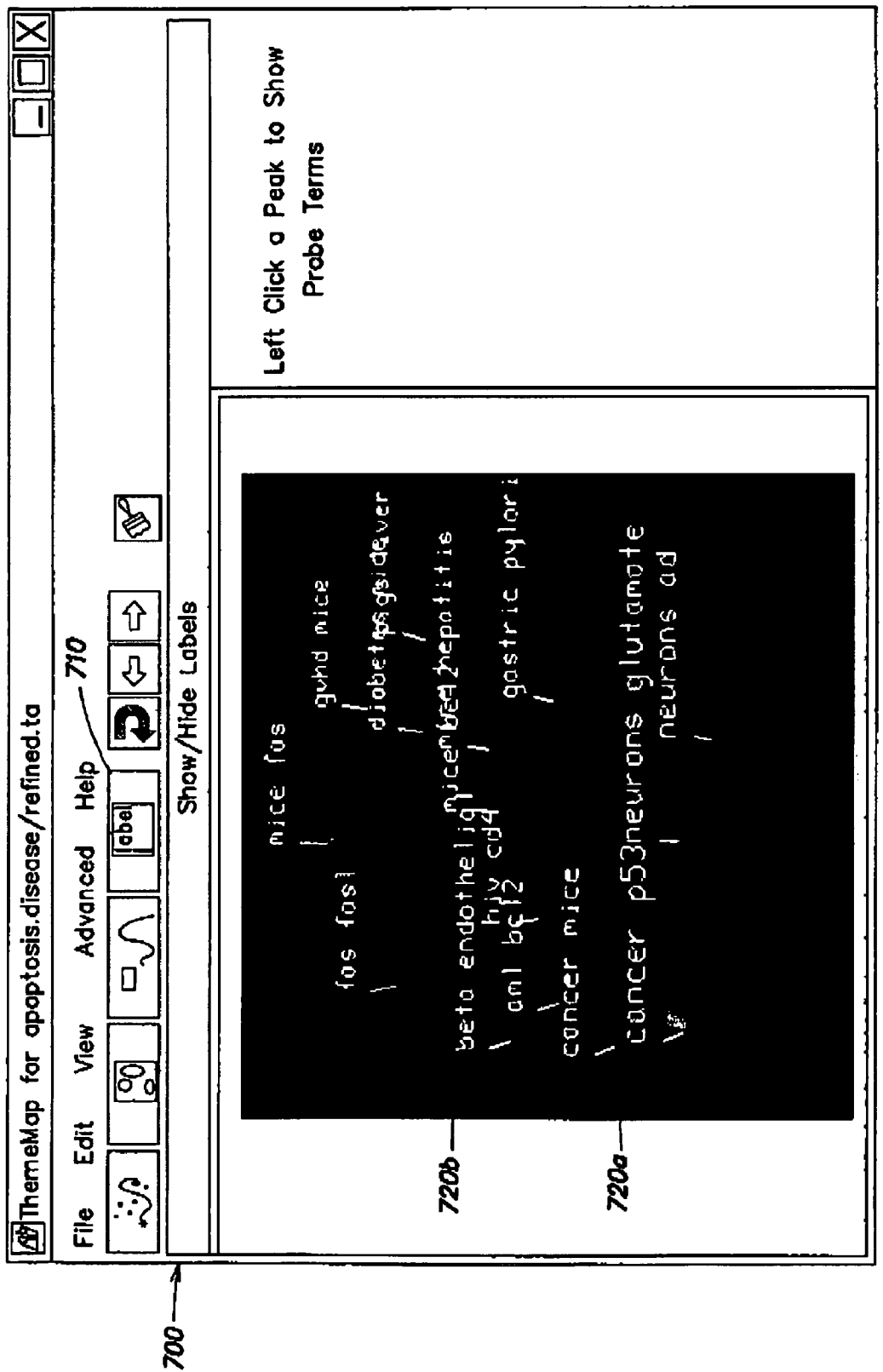
FIG. 7 is a diagram of labels added to the concept landscape consistent with the present invention.

Referring to FIG. 7, a peak label screen 700 is illustrated. The presentation of the landscape surface can be enhanced by the addition of labels 720 specifying the dominant theme term or terms. The labels have pointers pointing to peaks associated with the label. Label 720a specifies "cancer" and label 720b specifies "beta". The user may select which peaks are labeled by providing user preferences which are stored for later retrieval, or the user may simple indicate that labels are to be displayed based on default preference values. Peaks may be chosen for labeling based on a threshold height for the peak, specific content data record content associated with the peak, or other method. Peaks of the landscape view are presented with labels when the label button 710 is selected. When the label button 710 is selected, the user preferences for labels are accessed and the dominant theme terms associated with the peaks are accessed from the list of stored theme terms and are displayed in association with the corresponding peaks in accordance with the user preferences.

Other processes or tools may be used to enhance visualization and analysis of the landscape view. By adjusting the features (text words, phrases, or other attributes) used for the theme terms, an alternative view of the concepts within the data set can be provided. Allowing the user flexibility in the origin of the theme term list and which specific terms to use enables the user to focus on the set of concepts that are most valid for the task at hand. For example, the user can select via a user interface, theme terms for use in a subsequent re-computation of the surface by (1) changing the number of high-topicality terms from its default value of 200, (2) reordering the term list by value other than topicality, (3) individually selecting specific terms, or (4) using different attribute sets along with the other options. Once a new set of Theme Terms are defined, ThemeMapModel recomputes the grid of surface values as above, but the choice of key words is now limited to those within the new set.

Figure 8:
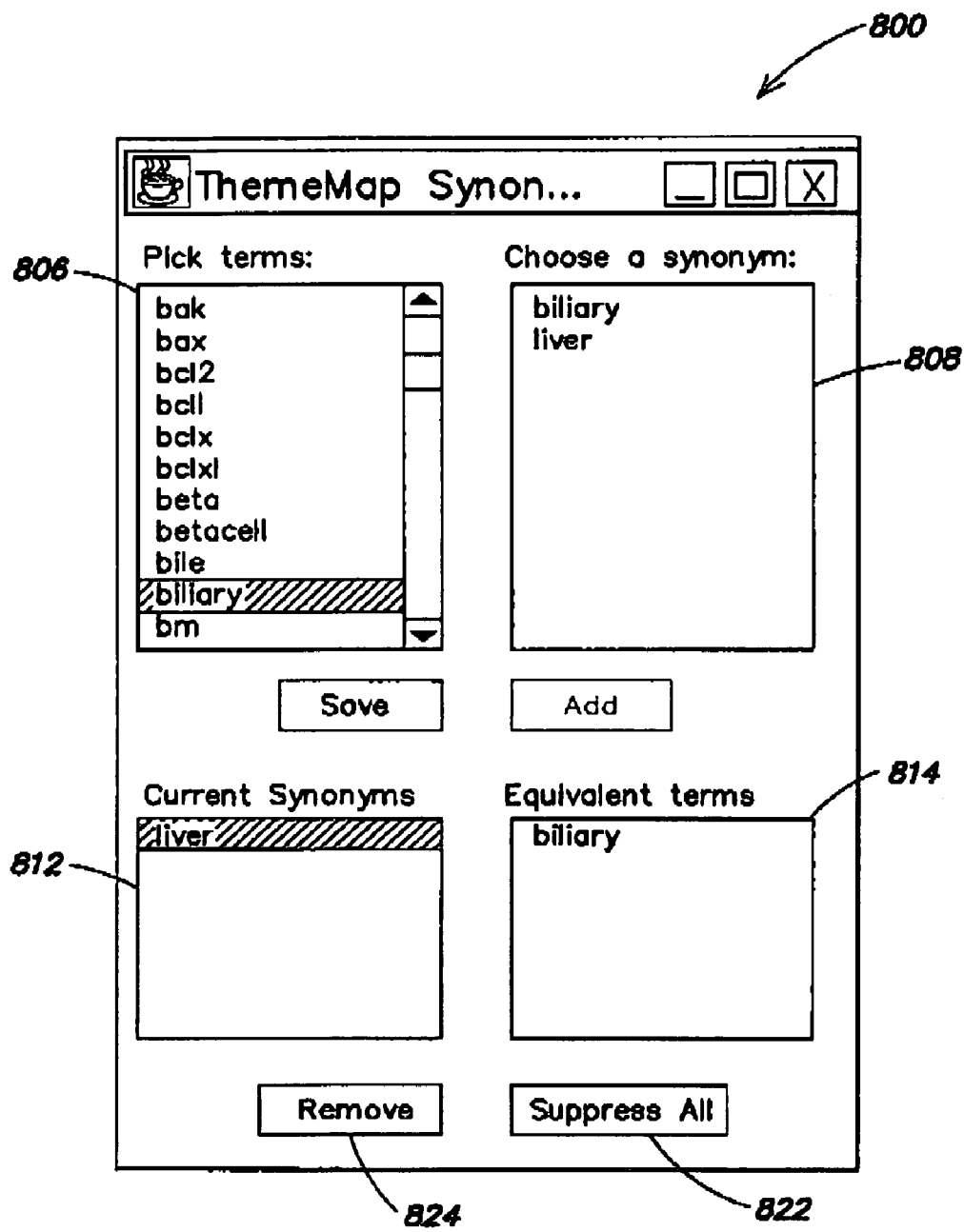
FIG. 8 shows an interface for defining synonyms to be used in calculating a landscape surface.

Referring to FIG. 8, a synonym definition screen 800 is illustrated. The synonym definition screen 800 enables a user to replace one or more attributes or theme terms associated with a set of data records with a user defined term (synonym) for use in re-computing the theme map that defines the landscape surface. In the landscape view discussed, any set of attributes associated with a data record may be the source of theme term if the theme term criterion is met. However, some attributes, although different in form as represented in the different data records analyzed, may be equivalent. The automated theme term calculation methods may not have accounted for these equivalences. For example, with word-based statistical methods, synonyms may or may not be recognized and handled as equivalent terms in the landscape calculation and analysis methods. As such, the user may desire to have the concept landscape recalculated with new synonym definitions in place.

In one embodiment, the user can invoke the synonym definition screen 800 dialog box which allows the arbitrary definition of synonym terms (FIG. 8). With this feature, any term can assume the same meaning as any other term or set of terms chosen by the user. All terms available from the data records are displayed in a pick item window 806 of the screen 800. The user may select a term, such as the term "biliary", and designate a word, such as the word "liver", in the synonym window 808 to serve as a synonym or substitute for "biliary". Thus, the term "liver" will be used instead of "biliary" in the computation of theme terms. The current synonym window 812 displays synonyms specified by the user and the equivalent term associated with the synonym is displayed in the equivalent item window 814.

Once the user has finished defining synonyms, the synonyms are saved in a list/table (referred to herein as a thesaurus) that associates the synonyms with the theme terms that they are to replace, and the concept landscape surface is recomputed to reflect the redistribution of topicality across the modified term (synonym) list. When the user has indicated the synonyms to be used, the resulting thesaurus created in the synonym module 278 (FIG. 2) is passed back to the proximity map module 262 where the topicality measure is then recomputed. For any method that is applied to determine term relevance, each synonym is treated as an equivalent term resulting in one relevance or significance measure for all equivalent synonyms. The underlying 2-dimensional map may or may not be altered, depending on user preference. Next, the dominant theme or aggregate theme algorithm is reapplied in the concept landscape visualization module 264 in view of the recomputed topicality values and the revised landscape is presented to the user. Thus, when a substitute term is substituted for two or more original terms of the data records, a second surface map representation may be generated based on the substitute term occurring at the data record locations of the original terms.

The user may temporarily suspend the effect of current synonym definitions by selecting the "suppress all" function 822, so that the impact of the synonym definitions on the visualization can be easily ascertained. Synonyms may be removed by selecting a synonym term and followed by selection of the remove function 824.

Figure 9:
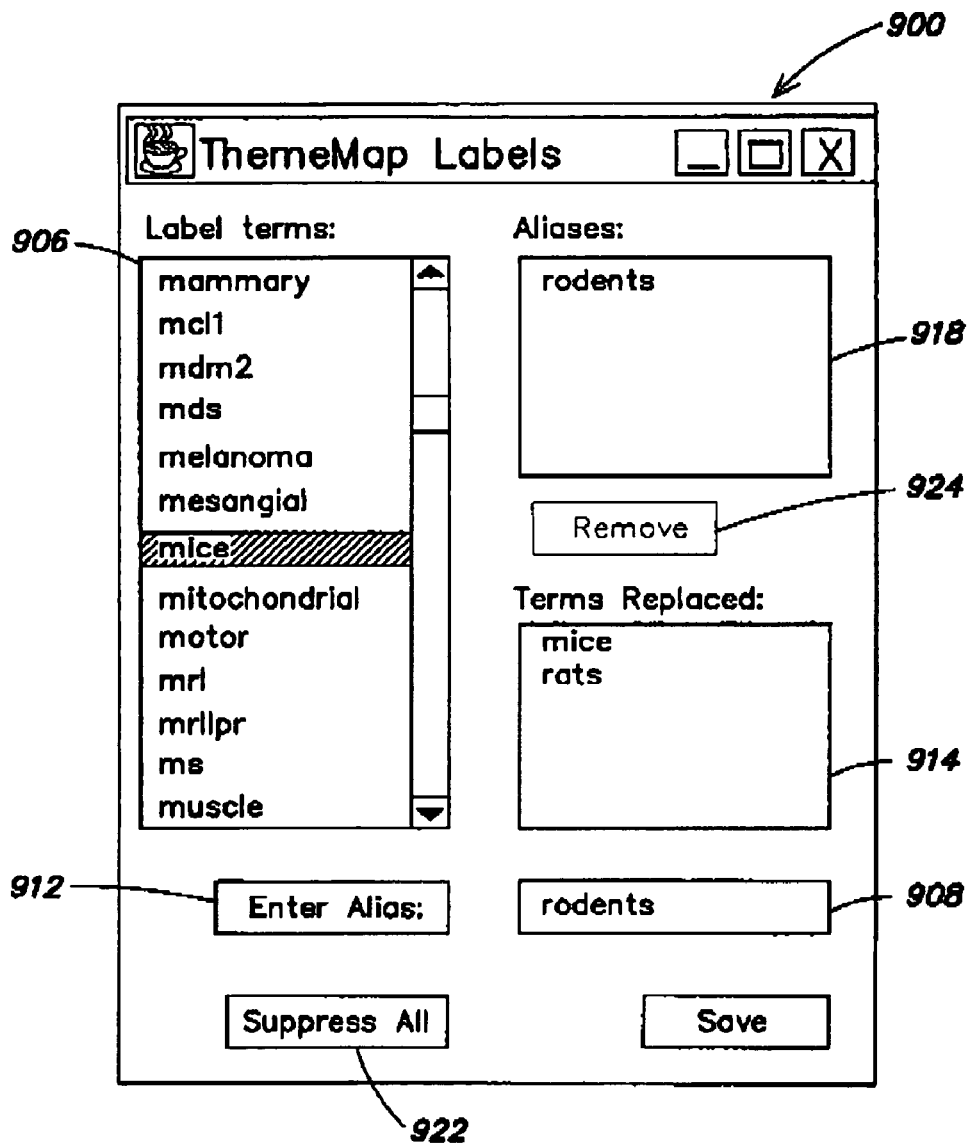
FIG. 9 shows a possible interface for customizing labels on the concept landscape surface.

Referring to FIG. 9, a custom peak label definition screen 900 is illustrated. The custom peak label definition screen 900 enables a user to replace the display of a theme term associated with a set of data records with a user defined term. Using a custom label does not affect the appearance of the surface of the landscape view. Instead, labels associated with a particular peak are changed throughout the landscape view in accordance with a user input.

In one embodiment, the user can invoke the custom peak label definition screen 900 dialog box that allows the specification of any string to replace an existing peak label (FIG. 9). With this feature, terms designated as labels for peaks of the landscape view are displayed in a label term window 906 of the screen 900. The user may select a term, such as the term "mice", and designate a word, such as the word "rodents", in the "input alias" window 908 to serve as a replacement labels for "mice". The user may also select the term "rats" and designate "rodents" to serve as a replacement label for "rats". The user designates the alias by selecting the "enter alias" button 912. Thus, the term "rodents" will be used instead of "mice" and "rats" in the display of labels on the landscape view. The terms replaced window 914 displays replaced labels specified by the user and the alias term associated with the replaced labels is displayed in the alias window 918. Once the user has finished defining labels to be replaced, the replacement labels are saved. When the landscape view is displayed again, the saved replacement labels are accessed and are displayed on the concept landscape surface replacing the original labels. The user may suspend the effect of current custom label definitions by selecting the "suppress all" function 922. Custom peak labels may be removed by selecting a custom peak term and followed by selection of the remove function 924.

The use of different surface calculation algorithms, the use of different synonym sets, and other analytical variations are provided as a means for comparison. To facilitate user assessment of the differences, whenever the surface landscape display is recomputed for any reason, the next display optionally can gradually replace the current display in a smooth, morphing action. This morphing can be accomplished by step-wise transition from the initial to final value within each cell or by any other known morphing algorithm. The user may enable or disable the morphing feature. Additionally, a user may switch back and forth between views by selection of "next" or "previous" buttons displayed on the display screen. This would enable the user to alternate between the previous view and the current view by alternately clicking "previous" and "next" buttons.

Figure 10:
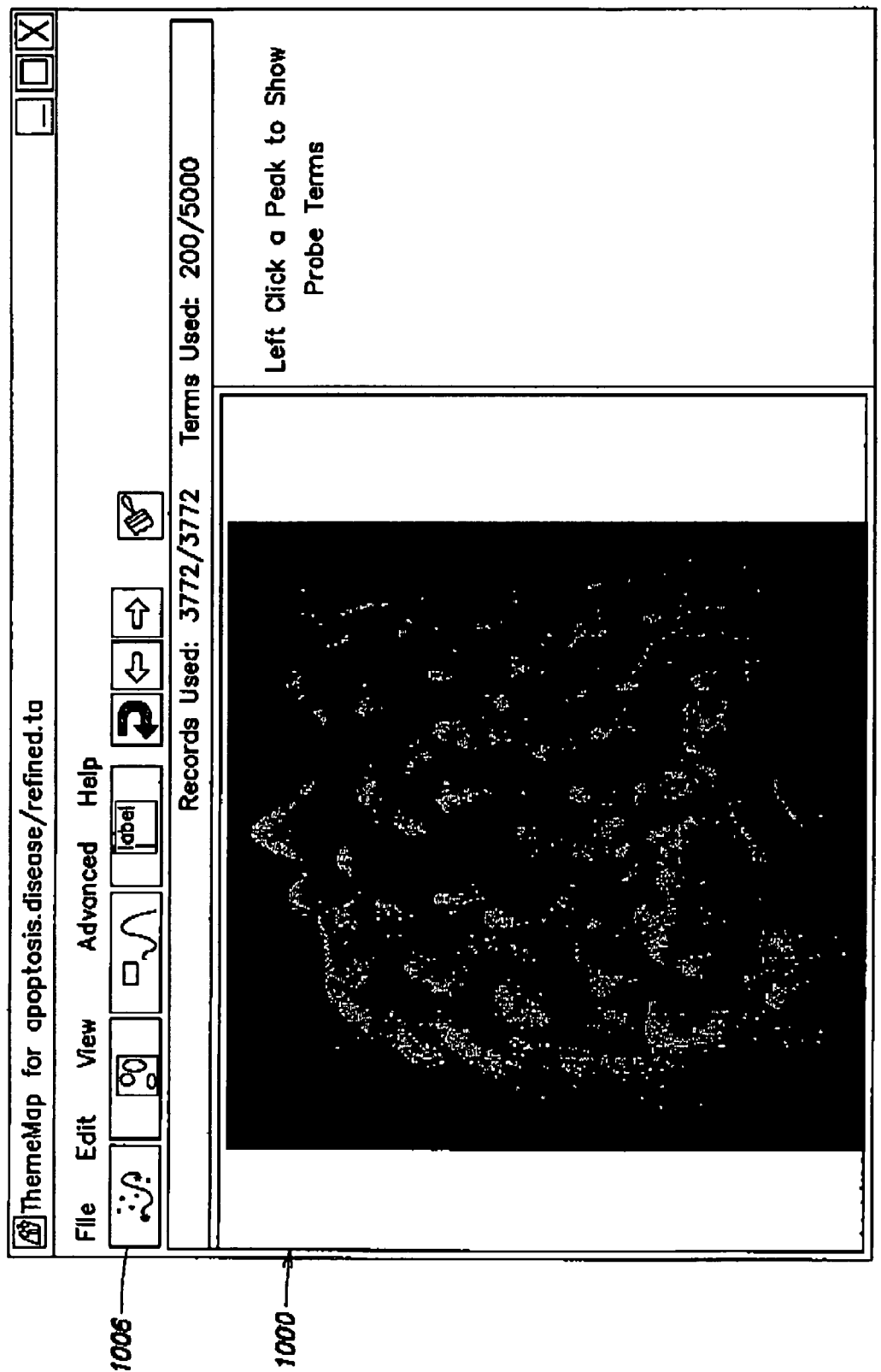
FIG. 10 is a diagram of a two-dimensional map overlaid on a concept landscape map consistent with the present invention.

Referring to FIG. 10, a landscape overlay screen 1000 is shown that illustrates a two-dimensional galaxy map superimposed over a landscape map. As noted above, a two dimensional galaxy map is created prior to generating a landscape map for the landscape view. When the landscape overlay screen 1000 is invoked by selection of the overlay button 1006, the two-dimensional map is retrieved and the points representing the two-dimensional map are correlated to corresponding locations of the landscape map, and the points representing the two-dimensional map are highlighted on corresponding points in the landscape view. Superimposing a visualization of the underlying two-dimensional information space over the landscape view can be used to provide context between the two visualization types. The points, glyphs, or other icons visualization are registered in their correct positions over the landscape grid, and maintain this relationship if the landscape is zoomed, rotated, or otherwise adjusted.

Figure 11:
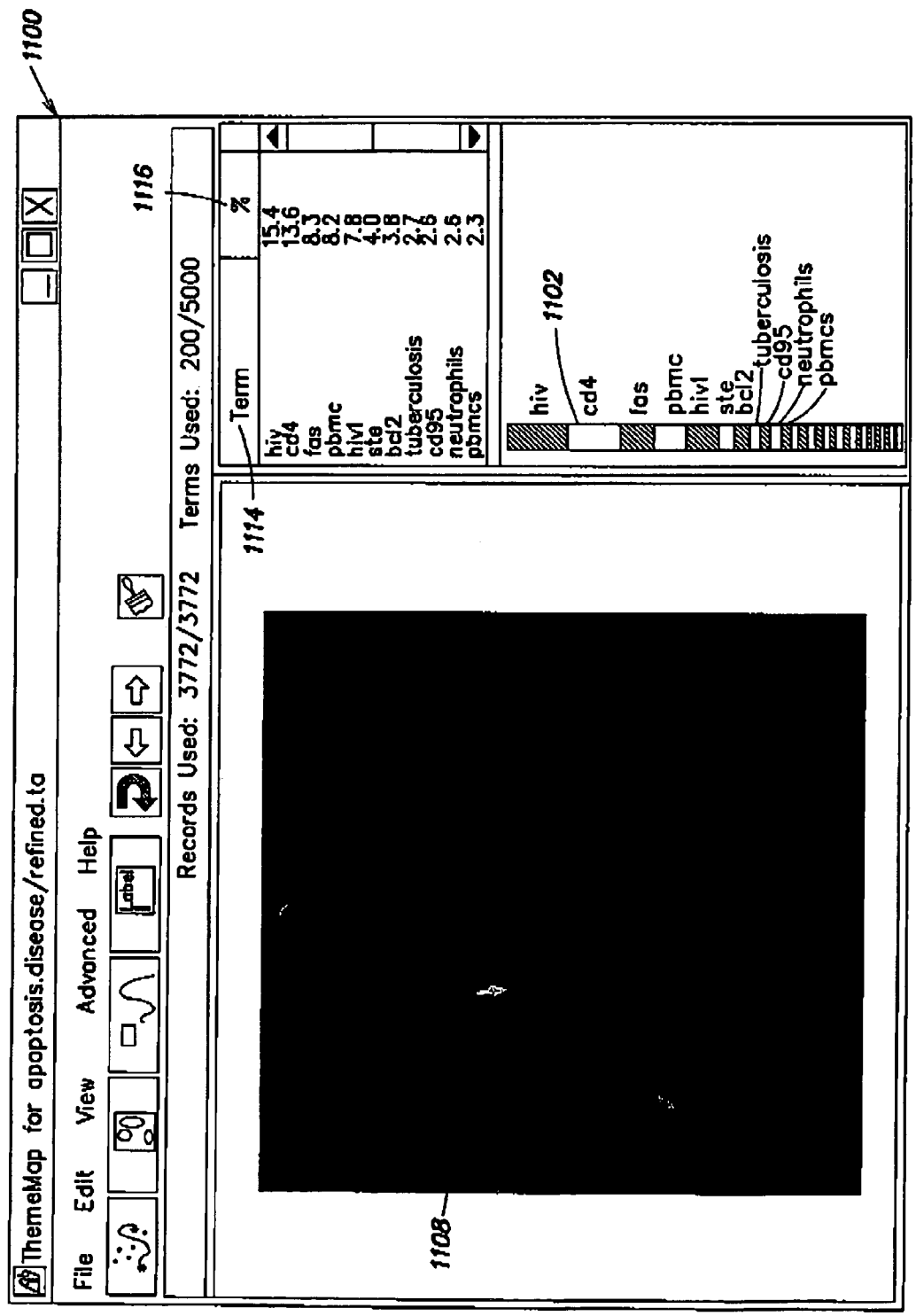
FIG. 11 shows an implementation of a theme term histogram consistent with the present invention which details the themes that underlie the region indicated by the arrow on the landscape.

Referring to FIG. 11, a histogram display screen 1100 is illustrated. In addition to the key terms being used as labels for peaks in the landscape view, the user may need access to the full distribution of terms underlying a given cell in the visualization. The term usage associated with a cell or peak is already defined by prior processing or can be easily calculated as needed. By accessing the information associated with a cell or peak, a stacked bar chart 1102 can be created that shows a visualization of all theme terms associated with a selected peak or region 1108 (FIG. 11). The bar chart may be actuated by user interaction or may be displayed automatically for cells meeting certain criteria related to the attributes associated with the selected peak or region. Invocation of the bar chart function, retrieves all associated terms 1114 and percentage value 1116 that represents the proportion of entire peak or region that the term represents. The bar chart 1102 displays the term name in close proximity to a segment of the bar chart that represents the term. The length of the segment of the bar chart relative to the entire length of the bar chart 1102 is proportional to the term's representation in the entire peak or region. The segments are ordered in decreasing value from the top to bottom of the bar chart. It should be appreciated that the segments can be ordered in an increasing order according to the percentage value. Additionally, the bar chart may be oriented horizontally rather than vertically. It should also be appreciated that a pie chart having segments corresponding to the terms may be used to represent the individual term's respective contribution to the calculation of the peak or region, in a similar manner as performed for the bar chart.

In another embodiment, a user can invoke a color-coding screen to color code peaks according the peaks height. Upon selection of this option, a dialog box can be made available that permits the user to assign or create color maps for redundant encoding of height information in the concept landscape surface. That is, a user can designate specific colors to represent specific peak heights. Thus, the peaks of the landscape view can be color coded according to peak height.

As described above in detail, methods and systems consistent with the invention allow textual data to be represented as a concept landscape visualization. Utilizing high-dimensional mathematical vectors derived by known methods and resulting 2-dimensional representations of those records, a corresponding concept map can be created.

The foregoing description and examples implementation are for the purpose of illustration and description. Modification and variation are possible in light of the above teachings. Although the embodiment described above has been implemented using JAVA, one skilled in the art will recognize that similar methods can be developed using other software approaches, a combination of software and hardware, or hardware only. The methods are also independent of specific computer architecture and can be accomplished on a variety of platforms and may be workstation-based or distributed as through a client-server architecture.

What is claimed is:

1. A computer-implemented method for generating visualizations from a set of data records, comprising the steps of:
   receiving a plurality of data records;
   creating vector representations of said data records;
   enabling the user to select from a first generation method and a second generation method different from the first method, wherein each method is for generating a concept landscape visualization;

generating a first concept landscape visualization corresponding to said vector representations in response to selection of said first generation method; and generating a second concept landscape visualization corresponding to said vector representations in response to selection of said second generation method, wherein the second visualization differs from the first visualization for the same said data records based on the selected method.

2. The method of claim 1 wherein said first and second methods calculate peak height by different methods.

3. The method of claim 2 wherein said first generation method comprises calculating the peak height based on a variable parameter.

4. The method of claim 3 wherein said variable parameter is chosen from a user-defined list.

5. The method of claim 4 wherein said variable parameter is based on the frequency of occurrence of a term from said data records.

6. The method of claim 3 wherein said variable parameter is automatically calculated.

7. The method of claim 2 wherein said second generation method comprises calculating said peak height based on the aggregate value of variable parameters.

8. The method of claim 6 wherein said variable parameter is based on the frequency of occurrence of a term from said data records.

9. The method of claim 1 wherein said second generation method comprises calculating peak height based on the aggregate value of variable parameters.

10. The method of claim 1 wherein first and second concept landscape visualizations are generated, and further comprising enabling a user to switch between the first and second visualizations to determine the influence of the first and second generation methods on said data records.

11. The method of claim 10 wherein said step of enabling a user to switch comprises enabling a user see a morphed transition between the first and second visualizations when the user chooses to view a different visualization.

12. The method of claim 1 wherein said step of creating vector representations includes generating a two-dimensional vector representation of said data records; generating a two-dimensional map representation of said data records based on said two-dimensional vector representation; and superimposing said two-dimensional map representation on either said first or second visualization.

13. A computer-implemented method for generating visualizations from a set of data records, comprising the steps of:
receiving a plurality of data records;
creating vector representations of said data records;
generating a concept landscape visualization of said data records corresponding to said vector representations, wherein the generating step includes selecting from different methods for generating different visualizations from the same said data records;
generating a two-dimensional map representation of said data records based on said vector representations; and
superimposing said two-dimensional map representation on said concept landscape visualization.

14. The method of claim 13 wherein said two-dimensional map representation is a galaxy view.

15. The method of claim 14 wherein the data records contain a plurality of terms and further comprising enabling the user to select terms used in calculating a surface height at points within the concept landscape visualization.

16. The method of claim 15 further comprising enabling a user to select a region of interest in the concept landscape visualization.

17. A computer-implemented method for presenting graphics based on visualizations from a set of data records, comprising the steps of:
generating a concept landscape visualization of data records corresponding to the significance of the terms in the data records;
receiving a user command to display information associated with a certain region of the visualization;
in response said step of receiving, retrieving terms associated with the region and a numerical value associated with each term, where the value associated with each retrieved term represents the proportion of the entire region that the retrieved term represents;
generating a chart that displays the name of retrieved terms; and
associating displayed terms with a segment of the chart that represents the displayed term, wherein the size of each segment of the chart is proportional to the term's representation in the region.

18. The method of claim 17 wherein the displayed term is displayed in proximity to the corresponding segment.

19. The method of claim 17 wherein the term's representation is based on the frequency of occurrence of the term in the region.

20. The method of claim 17 wherein the region is represented by a peak of the visualization.

21. The method of claim 17 wherein the chart is a bar chart.

22. The method of claim 21 wherein the segments are presented in decreasing order of magnitude of the value.

* * * * *